United States Patent
Kim et al.

(10) Patent No.: US 9,701,275 B2
(45) Date of Patent: Jul. 11, 2017

(54) PASSIVE HOOD HINGE FOR VEHICLE

(71) Applicants: Hyundai Motor Company, Seoul (KR); Kia Motors Corporation, Seoul (KR)

(72) Inventors: Sang Il Kim, Seoul (KR); Seong Tae Hong, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/955,920

(22) Filed: Dec. 1, 2015

(65) Prior Publication Data

US 2016/0273252 A1  Sep. 22, 2016

(30) Foreign Application Priority Data

Mar. 18, 2015  (KR) .................. 10-2015-0037169

(51) Int. Cl.
*E05D 7/00* (2006.01)
*B60R 21/34* (2011.01)

(52) U.S. Cl.
CPC ........ *B60R 21/34* (2013.01); *B60R 2021/343* (2013.01)

(58) Field of Classification Search
CPC ...... B60R 21/34; B60R 2021/343; E05D 7/00
USPC ... 16/222, 233, 349, 365–366, 371, DIG. 43
See application file for complete search history.

(56) References Cited

U.S. PATENT DOCUMENTS

| 2,702,400 | A | * | 2/1955 | Marple | E05D 15/40 16/287 |
| 6,345,679 | B1 | * | 2/2002 | Sasaki | B60R 21/38 180/271 |
| 6,513,617 | B2 | * | 2/2003 | Sasaki | B60R 21/38 16/222 |
| 6,543,086 | B2 | * | 4/2003 | Bjureblad | B60R 21/34 16/222 |
| 6,755,268 | B1 | | 6/2004 | Polz et al. | |
| 6,934,999 | B2 | * | 8/2005 | Kreth | B60R 21/34 16/222 |

(Continued)

FOREIGN PATENT DOCUMENTS

| JP | 2004-161076 A | 6/2004 |
| KR | 10-2002-0044971 A | 6/2002 |

(Continued)

*Primary Examiner* — Roberta Delisle
(74) *Attorney, Agent, or Firm* — Morgan Lewis & Bockius LLP

(57) ABSTRACT

A passive hood hinge for a vehicle includes a hinge bracket fixedly mounted to a body of the vehicle, a hinge arm connected to a hood and rotatable when opening or closing the hood, a lowering link pin inserted into a guide slot formed at a rear end of the hinge bracket, a lowering link having a middle portion hinged to the lowering link pin and a rear end hinged to the rear end of the hinge arm, a transfer link having front/rear ends respectively hinged to front end of the hinge bracket and rear end of the hinge arm, and a locking means that restricts the lowering link pin to be located in an upper region of the guide slot during ordinary operations, and allows the lowering link pin to be lowered toward a lower region of the guide slot when a hood panel is deformed by a collision.

7 Claims, 6 Drawing Sheets

- OPENED -

(56) References Cited

U.S. PATENT DOCUMENTS

| | | | |
|---|---|---|---|
| 6,964,316 B1 * | 11/2005 | Polz | B60R 21/34 16/222 |
| 7,231,995 B1 * | 6/2007 | Polz | B60R 21/34 16/222 |
| 7,469,447 B2 * | 12/2008 | Schlegel | E05D 3/145 16/306 |
| 7,774,900 B2 * | 8/2010 | Shaw | E05D 3/145 16/343 |
| 7,802,345 B2 * | 9/2010 | Mathew | E05D 15/46 16/370 |
| 7,845,053 B2 | 12/2010 | Marsh et al. | |
| 7,896,122 B2 * | 3/2011 | Borg | B62D 25/12 180/274 |
| 2012/0084942 A1 * | 4/2012 | Mehta | B60R 21/38 16/223 |

FOREIGN PATENT DOCUMENTS

| | | |
|---|---|---|
| KR | 10-2010-0008554 A | 1/2010 |
| WO | WO 00/69705 A1 | 11/2000 |
| WO | WO 00/69708 A1 | 11/2000 |

* cited by examiner

- CLOSED -

- OPENED -

PASSIVE HOOD HINGE FOR VEHICLE

CROSS-REFERENCE TO RELATED APPLICATION

The present application claims priority of Korean Patent Application Number 10-2015-0037169 filed on Mar. 18, 2015, the entire contents of which application are incorporated herein for all purposes by this reference.

BACKGROUND

Technical Field

The present disclosure relates to a passive hood hinge for a vehicle. More particularly, it relates to a passive hood hinge for a vehicle to alleviate impact exerted to a pedestrian who collides with the hood, thereby reducing injury of the pedestrian.

Background Art

As is well known, a hood for a vehicle is mounted to a body of a vehicle so as to be rotatable via a hinge assembly to open or close an engine room. The hinge assembly has a structure in which a plurality of links is combined depending on the hood's weight and strength.

If impact occurs between a pedestrian and a vehicle, the pedestrian may fall toward the hood in which the pedestrian such as the head of the pedestrian may be injured due to the impact, when the pedestrian collides with the vehicle.

Accordingly, an active hood system has been applied, which can alleviate an injury to the head by making the hood pop-up when the vehicle collides with the pedestrian, in order to meet the Pedestrian Protection Rules and improve marketability of a vehicle. However, since the active hood system increases production cost and weight of the vehicle, a development of another system for protecting the pedestrian is needed.

Thus, a passive hood system has been developed, that lowers the hood to alleviate a degree of injury to the pedestrian when the pedestrian collides with the vehicle, contrary to the active hood system that pops up the hood upwardly. However, there are problems in that a malfunction results from not having any part to detect a collision and weight of the vehicle increases.

The information disclosed in this Background section is only for enhancement of understanding of the general background of the invention and should not be taken as an acknowledgement or any form of suggestion that this information forms the prior art already known to a person skilled in the art.

SUMMARY OF THE DISCLOSURE

The present invention has been made in an effort to solve the above-described problems associated with prior art and/or other problems, and to provide a passive hood hinge for a vehicle, in which a collision is detected by deformation of a hood panel without requiring a separate part for detecting impact, a hinge arm and a lowering link, and the like which are connected to the hood panel are lowered as soon as the hood panel is deformed and, simultaneously or consequently, damping force of a spring is applied to a transfer link connected to the hinge arm so that a degree of injury to a pedestrian colliding with the hood can be substantially alleviated by the hood panel being lowered and the damping force of the spring.

In one aspect, the present invention provides a passive hood hinge for a vehicle, including: a hinge bracket fixedly mounted to a body of the vehicle; a hinge arm having a front end connected to a hood and rotatable at an angle about a rear end thereof when opening or closing the hood; a lowering link pin inserted into a guide slot formed at a rear end of the hinge bracket to be lowered or raised therein; a lowering link having a middle portion hinged to the lowering link pin and a rear end hinged to the rear end of the hinge arm; a transfer link having a front end hinged to a front end of the hinge bracket and a rear end hinged to the rear end of the hinge arm; and a lowering link pin locking means mounted around the guide slot of the hinge bracket, wherein the lowering link pin locking means restricts the lowering link pin to be located in an upper region of the guide slot during ordinary operations of the hood, and allows the lowering link pin to be lowered toward a lower region of the guide slot when a hood panel is deformed by a collision.

In a preferred embodiment, the lowering link connected with the lowering link pin, the hinge arm connected with the lowering link, and the transfer link connected with the hinge arm may be lowered together, when the lowering link pin is lowered toward the lower region of the guide slot.

In another preferred embodiment, the passive hood hinge according to the present invention may further include: a spiral spring mounted to a side of the front end of the hinge bracket; and a shock absorbing pin formed integrally or monolithically with a middle portion of the transfer link to protrude therefrom, wherein the shock absorbing pin is in contact with an upper surface of one end of the spiral spring to absorb shock.

In still another preferred embodiment, a stopper may be formed integrally or monolithically on an upper end of the hinge bracket, wherein the stopper restricts angular rotation of the front end of the lowering link when the lowering link is lowered.

In yet another preferred embodiment, the lowering link pin locking means may include: a passive lever having a rear end hinged to the hinge bracket and a front end which supports a bottom portion of the lowering link pin located in the upper region of the guide slot; and a stop bracket having a front end hinged to the hinge bracket and a rear end in surface contact with the passive lever to restrict a rotation of the passive lever, wherein a restricting force of the stop bracket to restrict the passive lever is released by a lowering force of the lowering link corresponding to deformation of the hood panel.

In still yet another preferred embodiment, a curved recess may be formed on a front side of the passive lever, and a convex restricting end being in surface contact with the recess may be formed on a back side of the stop bracket.

In a further preferred embodiment, a rotation restricting end that is supported on a floor surface of the hinge bracket and restricts a downward angular rotation of the stop bracket may be formed integrally or monolithically at a lower end of the stop bracket.

The present invention provides for at least the following effects.

First, a degree of injury of the pedestrian colliding with the hood can be remarkably reduced, firstly, by lowering the hood panel and the hinge arm, the lowering link connected with the hinge arm, the transfer link, and the like, to absorb shock when the hood panel is deformed by a collision with the pedestrian and, secondly, by absorbing the impact exerted to the pedestrian by damping power of the spring applied to the transfer link connected to the hinge arm.

Second, absorbing the shock for the pedestrian can be easily achieved by detecting deformation of the hood panel without a separate means for sensing a collision with the pedestrian.

Third, reduced size and weight compared to an existing active hood latch or active hood hinge can be realized.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
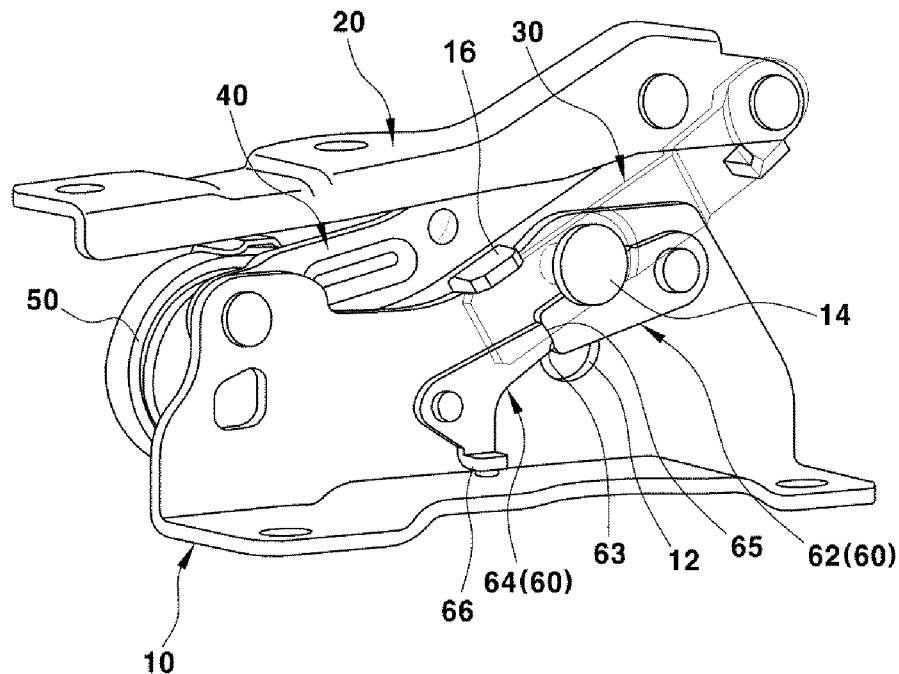
FIG. 1 is a perspective view illustrating an exemplary passive hood hinge for a vehicle according to the present invention.

Reference numerals set forth in the Drawings includes reference to the following elements as further discussed below:

10: hinge bracket
14: lowering link pin
20: hinge arm
40: transfer link
50: spiral spring
12: guide slot
16: stopper
30: lowering link
42: shock absorbing pin
60: lowering link pin locking means
62: passive lever
64: stop bracket
66: rotation restricting end
63: recess
65: convex restricting end It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a perspective view illustrating an exemplary passive hood hinge for a vehicle according to some embodiments of the present invention. In FIG. 1, reference number 10 indicates a hinge bracket fixedly mounted to a body of a vehicle around an engine room, and reference number 20 indicates a hinge arm connected between a hood panel and the hinge bracket so as to be rotated at an angle when the hood panel is opened or closed.

The hinge arm 20, a front end of which is connected to the hood, is rotated at an angle about a rear end thereof so as to open or close the hood panel.

In some embodiments, the hinge bracket 10 includes a horizontal plate mounted to the body, and a vertical plate bent vertically or substantially vertically at a side end of the horizontal plate, and an elongated guide slot 12 such as a vertically elongated guide slot is formed at a rear end of the vertical plate.

A lowering link pin 14 is inserted into the guide slot 12 of the hinge bracket 10 to be lowered or raised therein, and a middle portion of a lowering link 30 is hinged to the lowering link pin 14. Herein, the term "hinged" refers to pivotal connection by hinge, pivot, pin or the like.

More specifically, in a state in which the middle portion of the lowering link 30 is hinged to the lowering link pin 14, a front end of the lowering link 30 is left as a free end and a rear end of the lowering link 30 is hinged to the rear end of the hinge arm 20.

In some embodiments, a stopper 16 is formed integrally or monolithically at an upper portion of the hinge bracket 10 to protrude therefrom, with which the front end of the lowering link 30 is in contact so as to be caught, and the stopper 16 serves to restrict angular rotation of the front end of the lowering link 30 when the lowering link 30 is lowered.

A transfer link 40 to support the hinge arm when the hinge arm 20 is rotating at an angle is mounted on a back side of the hinge bracket 10, that is, an opposite side of a side on which the lowering link 30 is mounted, in which a front end of the transfer link 40 is hinged to the front end of the hinge bracket 10 and the rear end of the transfer link 40 is hinged to the rear end of the hinge arm 20.

A spiral spring 50 is mounted at a predetermined location on the hinge bracket 10, that is, at a location around a point to which the front end of the transfer link 40 is hinged, and one end of the spiral spring is arranged to be extended longitudinally.

In some embodiments, a shock absorbing pin 42 is formed integrally with the middle portion of the transfer link 40 to protrude therefrom, and a bottom portion of the shock absorbing pin 42 is in contact with an upper surface of the one end of the spiral spring 50.

Therefore, when the shock absorbing pin 42 presses the one end of the spiral spring 50 due to impact caused by a collision with the pedestrian as described below, the spiral spring 50 exerts elastic restoring force and provides shock absorbing action.

Meanwhile, a lowering link pin locking means 60 is mounted about the guide slot 12 of the hinge bracket 10, in which the lowering link pin locking means 60 restricts the lowering link pin 14 to be located in an upper region of the guide slot 12 during ordinary times, and allows the lowering link pin 14 to be lowered toward a lower region of the guide slot 12 when the hood panel is deformed by a collision with the pedestrian.

According to some embodiments of the present invention, the lowering link pin locking means includes a passive lever 62 for supporting the lowering link pin 14 to locate the lowering link pin 14 in the upper region of the guide slot 12 during ordinary times, and a stop bracket 64 for restricting angular rotation of the passive lever 62.

More specifically, a rear end of the passive lever 62 is hinged to the hinge bracket 10, a front end of the passive lever 62 supports a bottom portion of the lowering link pin 14 located in the upper region of the guide slot 12, a front end of the stop bracket 64 is hinged to the hinge bracket 10, and at the same time, a rear end of the stop bracket 64 is in surface contact with the front side of the passive lever 62 to restrict angular rotation of the passive lever 62.

Preferably, a curved recess 63 is formed on the front side of the passive lever 62, and a convex restricting end 65 that is in surface contact with the recess 63 is formed on the back side of the stop bracket 64.

A rotation restricting end 66 is formed integrally or monolithically at the lower end of the stop bracket 64, in which the rotation restricting end 66 is closely supported on a floor surface of the hinge bracket 10 and restricts a downward angular rotation of the stop bracket 64.

Accordingly, the downward angular rotation of the passive lever 62 is restricted by the stop bracket 64 during ordinary times, so that the passive lever 62 supports the bottom portion of the lowering link pin 14 located in the upper region of the guide slot 12.

On the contrary, if lowering force of the lowering link pin 14 caused by deformation of the hood panel colliding with the pedestrian acts upon the passive lever 62, the restricting force of the stop bracket 64 to the passive lever 62 is released and, consequently, the passive lever 62 is rotated at an angle downward, so that the lowering link pin 14 is able to be lowered from the upper region of the guide slot 12 to the lower region.

Actuation flow regarding the passive hood hinge according to the present invention constructed like above will be described below.

Actuation During Ordinary Times

Figure 2A:
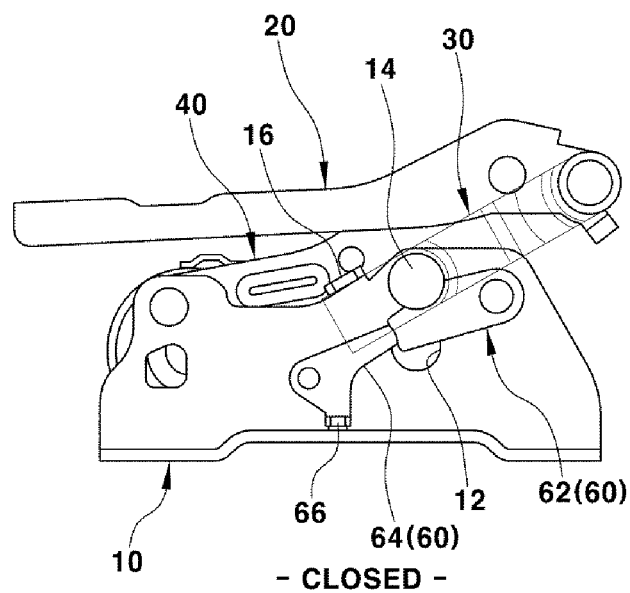
FIG. 2A and FIG. 2B are right side views illustrating a state of an ordinary operation of an exemplary passive hood hinge for the vehicle according to the present invention.
Figure 2B:
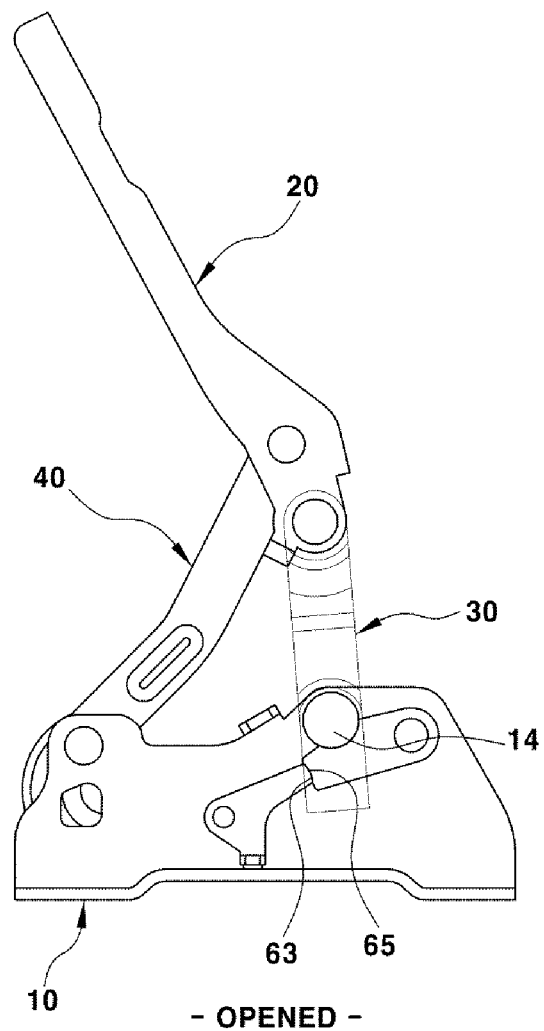

FIG. 2A and FIG. 2B are right side views illustrating a state of an ordinary operation of the passive hood hinge for vehicles according to some embodiments of the present invention.

As illustrated in FIGS. 2A and 2B, if a user opens up the hood during ordinary times (a situation in which neither collision with the pedestrian nor deformation of the hood panel occurs), the hinge arm 20 connected with the hood panel rotates at an angle while being stretched out in an open direction and, at this time, the lowering link pin 30 and the transfer link 40 rotate at an angle in the open direction while supporting the hinge arm 20 about each of the hinge or pivot points.

On the contrary, if the hood is closed, the hinge arm 20 connected with the hood panel rotates at an angle to be folded and arranged horizontally or substantially horizontally above the hinge bracket 10. The lowering link pin 30 and the transfer link 40 rotate angularly at an angle to be folded in the close direction of the hood about each of the hinge points.

At this time, a state in which the recess 63 of the passive lever 62 and the convex restricting end 65 of the stop bracket 64 are in surface contact with each other is maintained, and the downward angular rotation of the passive lever 62 is restricted by the stop bracket 64, so that the passive lever 62 supports the bottom portion of the lowering link pin 14 located in the upper region of the guide slot 12.

Actuation Upon Pedestrian Collision

FIGS. 3 to 7 sequentially illustrate an actuation flow upon collision with the pedestrian of the passive hood hinge for the vehicle according to some embodiments of the present invention.

Figure 3A:
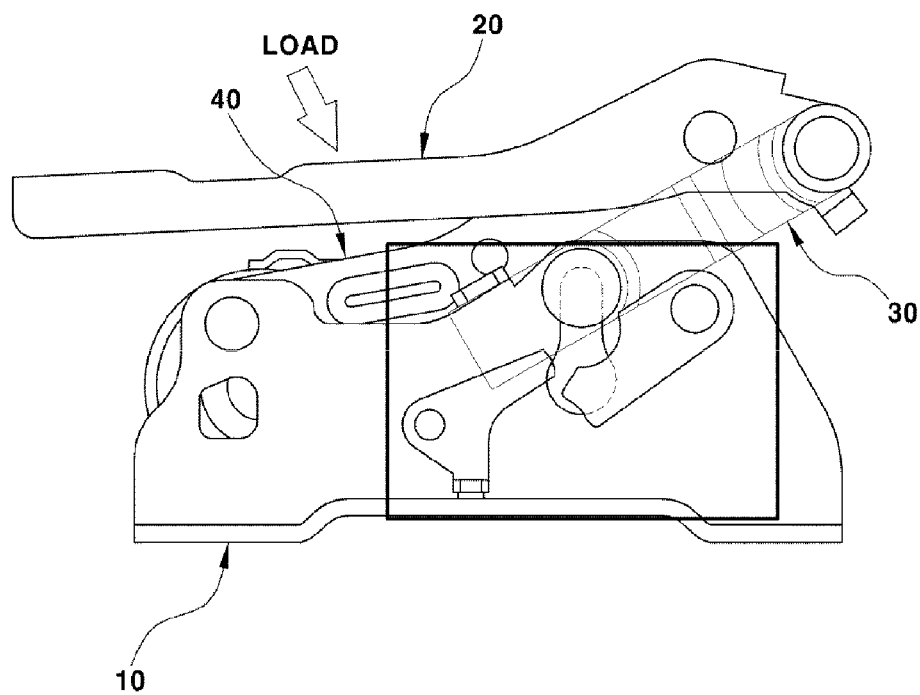
FIG. 3A is a right side view illustrating a release operation of a passive lever of an exemplary passive hood hinge for the vehicle according to the present invention when a pedestrian collides with the vehicle.
Figure 3B:
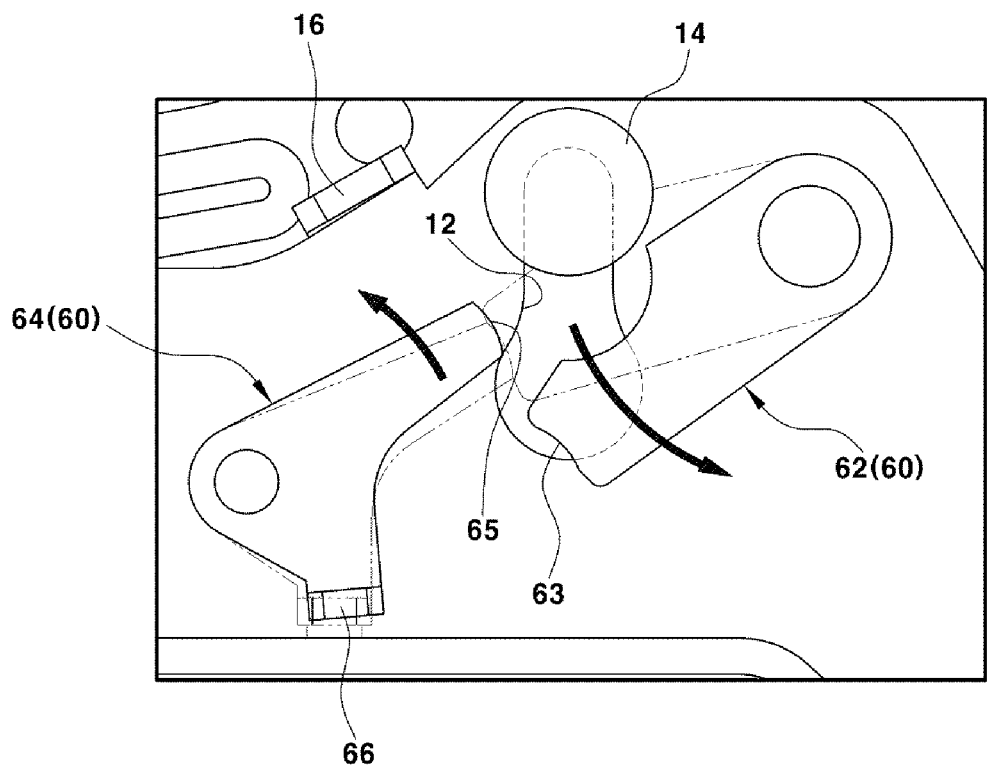
FIG. 3B is a partially enlarged view of FIG. 3A.

As illustrated in FIGS. 3A and 3B, if an impact is transferred to the hinge arm 20 when the hood panel is deformed by collision with the pedestrian, the impact is also transferred to the lowering link 30 connected with the hinge arm 20, so that a lowering force of the lowering link 30 is transferred to the lowering link pin 14.

Then, when the lowering force transferred to the lowering link pin 14 acts on the passive lever 62, restricting force of the stop bracket 64 relative to the passive lever 62 is released and, consequently, the passive lever 62 is rotated at an angle downward.

That is, the lowering force of the lowering link pin 14 applied to the passive lever 62 becomes larger than the restricting force of the stop bracket 64 to restrict the passive lever 62, so that the restricting force of the stop bracket 64 relative to the passive lever 62 is released and, consequently, the passive lever 62 is rotated at an angle in downward direction.

Figure 4:
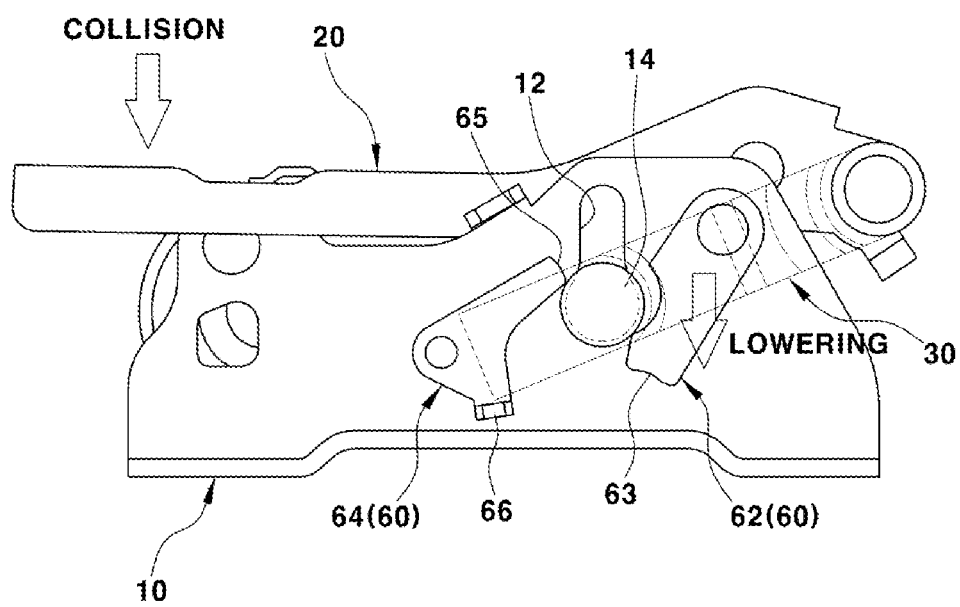
FIG. 4 is a right side view illustrating a lowering operation of a lowering link pin of an exemplary passive hood hinge for the vehicle according to the present invention when the pedestrian collides with the vehicle.

Subsequently, as illustrated in FIG. 4, as the passive lever 62 is rotated downward at an angle, the lowering link pin 14 is moved down from the upper region to the lower region of the guide slot 12.

At this time, when the lowering link pin 14 is lowered into the lower region of the guide slot 12, the lowering link 30 connected with the lowering link pin 14, the hinge arm 20 connected with the lowering link 30, and the transfer link 40 connected with the hinge arm 20 are lowered together, so that, eventually, impact exerted to the pedestrian is alleviated, firstly, by lowering the hood panel connected with the hinge arm upon collision with the pedestrian.

Figure 6:
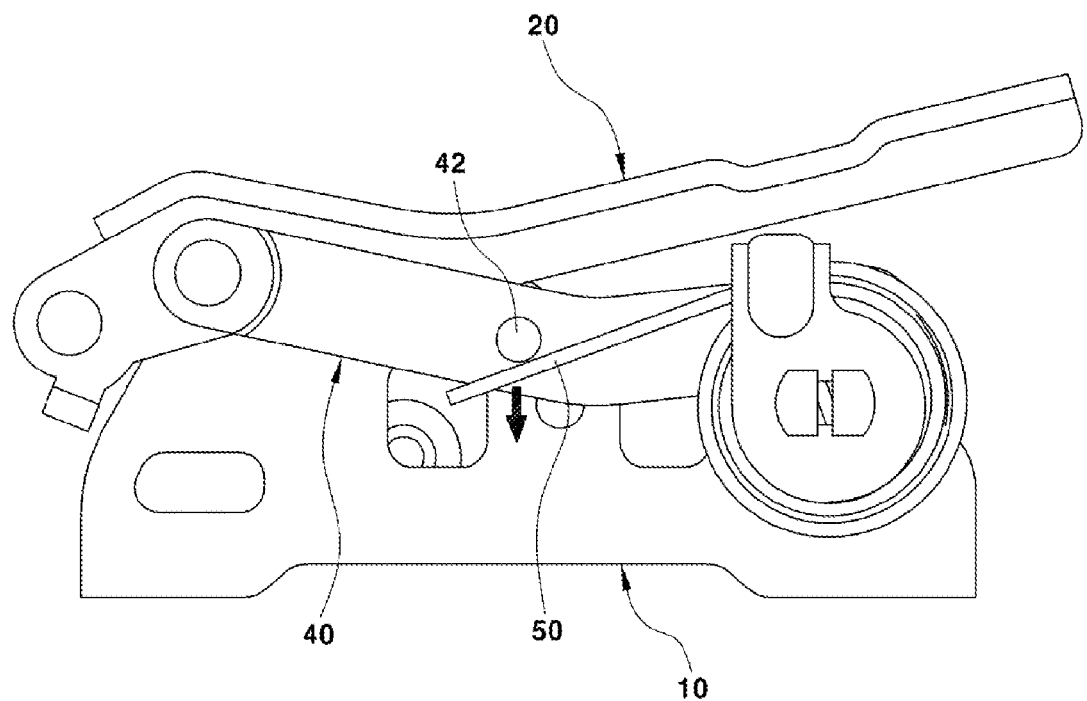
FIG. 6 and FIG. 7 are a left side view and a perspective view illustrating a shock absorbing operation of a spiral spring by lowering of a transfer link of an exemplary passive hood hinge for the vehicle according to the present invention when the pedestrian collides with the vehicle.
Figure 7:
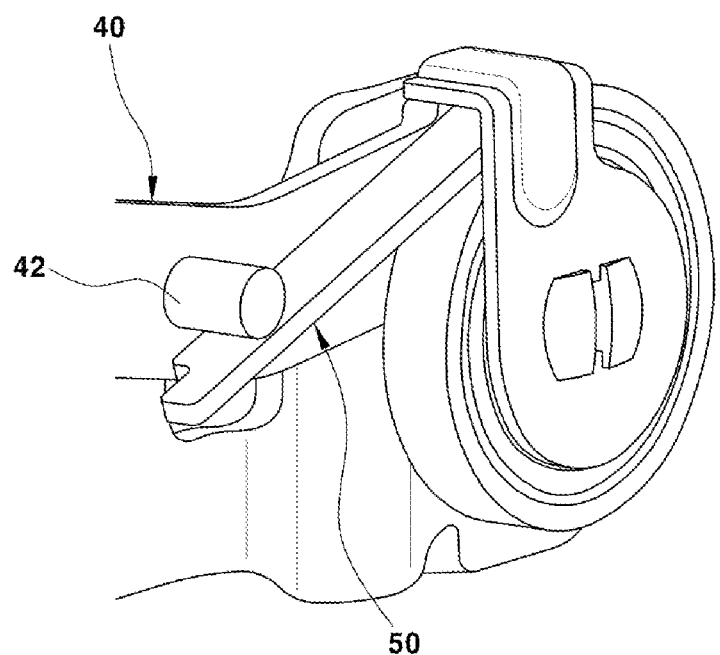

As illustrated in FIGS. 6 and 7, the shock absorbing pin 42 of the transfer link 40 which is lowered simultaneously with the lowering link pin 14 pressurizes one end of the spiral spring 50, so that elastic restoring force from the spiral spring 50 alleviates, secondly, the impact exerted to the pedestrian.

Figure 5:
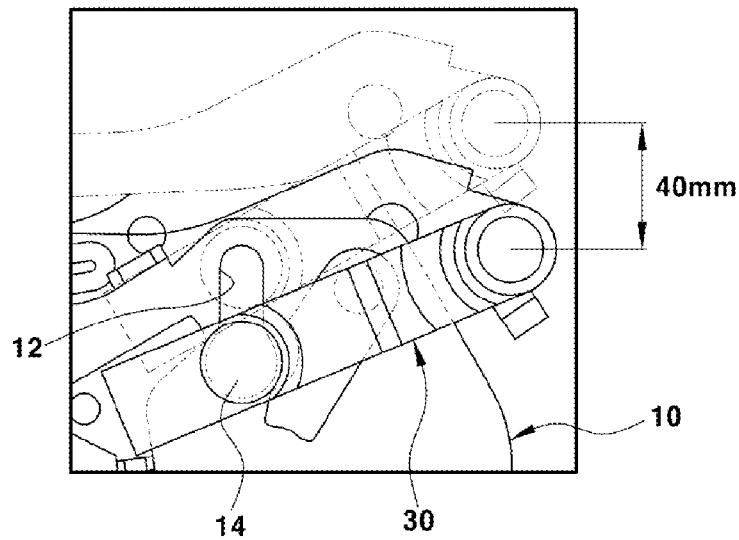
FIG. 5 is a view illustrating a lowering distance of the lowering link pin of an exemplary passive hood hinge for the vehicle according to the present invention when the pedestrian collides with the vehicle.

Meanwhile, in some embodiments, as illustrated in FIG. 5, a downward moving distance of all of the lowering link 30 connected with the lowering link pin 14, the hinge arm 20 connected with the lowering link 30, and the transfer link 40 connected with the hinge arm 20 may be set to, for example, about 40 mm, and the downward moving distance may be adjusted depending on designs of the hood and the hinge assembly.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A passive hood hinge for a vehicle comprising:
   a hinge bracket fixedly mounted to a body of the vehicle;
   a hinge arm having a front end connected to a hood and rotatable at an angle about a rear end thereof when opening or closing the hood;
   a lowering link pin inserted into a guide slot formed at a rear end of the hinge bracket to be lowered or raised therein;
   a lowering link having a middle portion hinged to the lowering link pin and a rear end hinged to the rear end of the hinge arm;
   a transfer link having a front end hinged to a front end of the hinge bracket and a rear end hinged to the rear end of the hinge arm; and
   a lowering link pin locking means mounted around the guide slot of the hinge bracket, wherein the lowering link pin locking means restricts the lowering link pin to be located in an upper region of the guide slot during ordinary operations of the hood, and allows the lowering link pin to be lowered toward a lower region of the guide slot when a hood panel is deformed by a collision.

2. The passive hood hinge of claim 1, wherein the lowering link connected with the lowering link pin, the hinge arm connected with the lowering link, and the transfer link connected with the hinge arm are lowered together, when the lowering link pin is lowered toward the lower region of the guide slot.

3. The passive hood hinge of claim 1, further comprising:
   a spiral spring mounted to a side of the front end of the hinge bracket; and
   a shock absorbing pin formed integrally or monolithically with a middle portion of the transfer link to protrude therefrom, wherein the shock absorbing pin is in contact with an upper surface of one end of the spiral spring to absorb shock.

4. The passive hood hinge of claim 1, wherein a stopper is formed integrally or monolithically on an upper end of the hinge bracket, wherein the stopper restricts angular rotation of the front end of the lowering link when the lowering link is lowered.

5. The passive hood hinge of claim 1, wherein the lowering link pin locking means includes:
   a passive lever having a rear end hinged to the hinge bracket and a front end which supports a bottom portion of the lowering link pin located in the upper region of the guide slot; and
   a stop bracket having a front end hinged to the hinge bracket and a rear end in surface contact with the passive lever to restrict a rotation of the passive lever, wherein
   a restricting force of the stop bracket to restrict the passive lever is released by a lowering force of the lowering link corresponding to deformation of the hood panel.

6. The passive hood hinge of claim 5, wherein a curved recess is formed on a front side of the passive lever, and a convex restricting end being in surface contact with the recess is formed on a back side of the stop bracket.

7. The passive hood hinge of claim 5, wherein a rotation restricting end that is supported on a floor surface of the hinge bracket and restricts a downward angular rotation of the stop bracket is formed integrally or monolithically at a lower end of the stop bracket.

* * * * *